United States Patent [19]
Allread et al.

[11] Patent Number: 5,385,331
[45] Date of Patent: Jan. 31, 1995

[54] VALVE ASSEMBLY

[75] Inventors: Alan R. Allread, Armada; Jon A. Jensen, New Baltimore, both of Mich.

[73] Assignee: Aeroquip Corporation, Maumee, Ohio

[21] Appl. No.: 213,440

[22] Filed: Mar. 15, 1994

[51] Int. Cl.⁶ ............................................. F16L 37/28
[52] U.S. Cl. .............................. 251/149.1; 251/149.6
[58] Field of Search ............. 251/149.1, 149.6, 149.7, 251/149.8; 137/614.04, 614.05

[56] References Cited

U.S. PATENT DOCUMENTS

| | | | |
|---|---|---|---|
| 4,123,089 | 10/1978 | Viero et al. | 251/149.6 X |
| 4,331,177 | 5/1982 | Makishima | 251/149.8 X |
| 4,865,077 | 9/1989 | Batchen et al. | 137/614.04 |
| 4,971,107 | 11/1990 | Yonezawa | 137/614.05 X |
| 5,215,122 | 6/1993 | Rogers et al. | 137/614 |
| 5,226,682 | 7/1993 | Marrison et al. | 285/308 |

FOREIGN PATENT DOCUMENTS 717483  1/1932  France ............................. 251/149.7

Primary Examiner—Martin P. Schwadron
Assistant Examiner—Kevin L. Lee
Attorney, Agent, or Firm—Emch, Schaffer, Schaub & Porcello Co.

[57] ABSTRACT

A valve assembly for use in the coupling of two members. The first member has an exterior surface and an interior surface. The interior surface defines a coupling sleeve and a valve sleeve. A fluid passageway is in communication between the coupling sleeve and the valve sleeve. A valve is positioned in the valve sleeve. The valve is biased toward the fluid passageway by a coiled spring. A valve pusher having a first end and a second end is positioned in the coupling sleeve and the fluid passageway. The assembly has a second member having an outer surface, an inner surface and a terminal portion. When the second member is inserted in the coupling sleeve, the terminal portion engages the first end of the valve pusher causing the second end of the pusher to engage the valve to unseat the valve to allow unrestricted fluid flow between the first member and the second member.

14 Claims, 4 Drawing Sheets

VALVE ASSEMBLY

BACKGROUND OF THE INVENTION

The present invention is directed to a valve assembly for use in the coupling of two members. More specifically, the invention is directed to a ball valve assembly for a quick disconnect coupling for two members that carry fluid.

There is a need for quick disconnect couplings that prevent fluid leakage when the members are disconnected. The present invention satisfies this need by providing a quick disconnect coupling with a valve that is efficient, simple to use and relatively inexpensive.

SUMMARY OF THE INVENTION

The present invention is directed to a valve assembly for use in the coupling of two members. The first member has an exterior surface and an interior surface. The interior surface defines a coupling sleeve and a valve sleeve. A fluid passageway is in communication between the coupling sleeve and the valve sleeve. A valve is positioned in the valve sleeve. The valve is biased toward the fluid passageway by a coiled spring. A valve pusher having a first end and a second end is positioned in the coupling sleeve and the fluid passageway.

The invention further includes a second member having an outer surface, an inner surface and a terminal portion. When the second member is inserted in the coupling sleeve, the terminal portion engages the first end of the valve pusher causing the second end of the pusher to engage the valve to unseat the valve to allow unrestricted fluid flow between the first member and the second member.

The primary object of the present invention is to provide a valve assembly for the coupling of two members that is efficient.

The important objects of the present invention include a valve assembly for a coupling that is simple and inexpensive.

Other objects of the present invention will become apparent upon a review of the drawings and the following description of the invention.

BRIEF DESCRIPTION OF THE DRAWINGS

FIG. 1A is a cross-sectional view taken along line 1A—1A of FIG. 1 showing the coiled spring of the present invention;

DETAILED DESCRIPTION OF THE PREFERRED EMBODIMENTS

Figure 1:
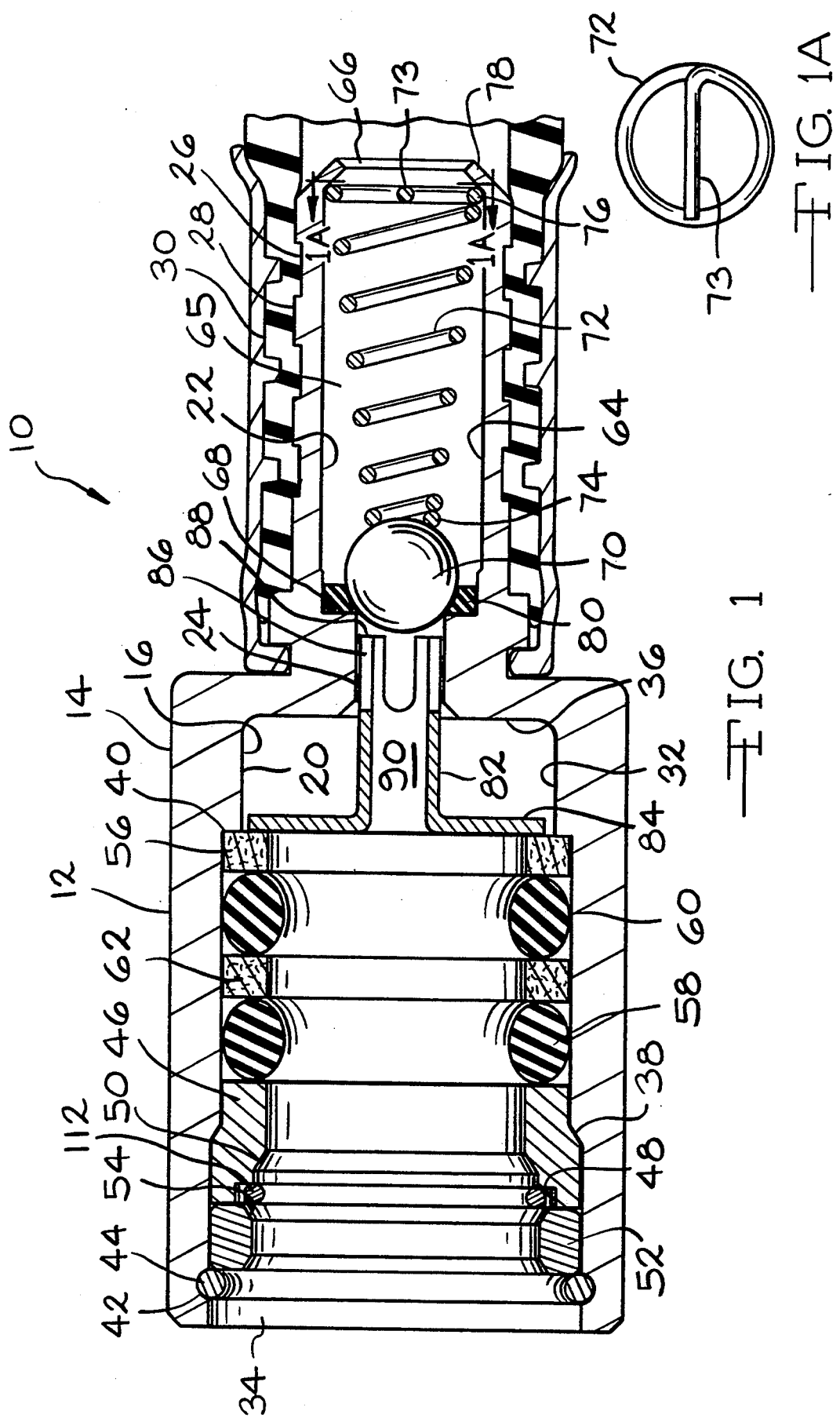
FIG. 1 is a cross-sectional view of a first embodiment of the present invention showing the first member.
Figure 2:
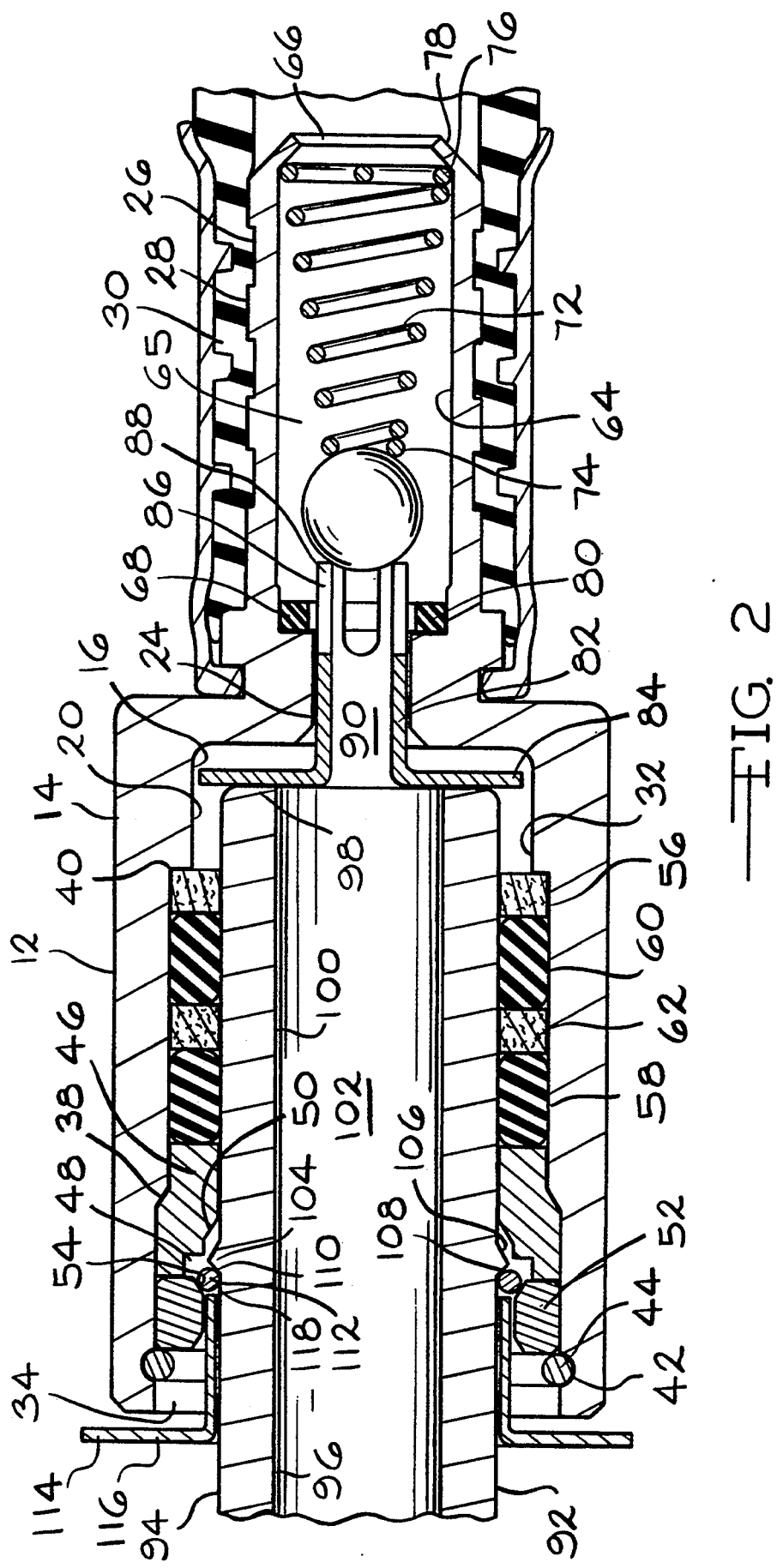
FIG. 2 is a cross-sectional view of the first embodiment showing the first and second members connected together according to the present invention.

The present invention will now be described in detail with reference being made to the accompanying drawings. Referring now to FIGS. 1 and 2, the valve assembly of the present invention is designated by the reference number 10. The assembly 10 includes a first member 12 having an exterior surface 14 and an interior surface 16. The interior surface 16 defines a coupling sleeve 20 and a valve sleeve 22. An annular fluid passageway 24 is positioned between the coupling sleeve 20 and the valve sleeve 22.

As shown in FIG. 1, the exterior surface 14 can define a tube receiving portion 26 having raised teeth 28 for receiving hose or tubing 30. The tubing 30 is used as a conduit for fluid transport.

The coupling sleeve 20 consists of an annular wall 32 having an open end 34 and an opposed coupling sleeve fluid passageway end 36. An inwardly extending radial lip 37 is adjacent to the open end 34. As shown in FIG. 1, the annular wall 32 defines a first annular shoulder 38, a second annular shoulder 40 spaced from the first annular shoulder, and an annular groove 42 positioned between the open end 34 and the first shoulder 38. An annular ring 44 is positioned in the annular groove 42. An annular lock assisting member 46 having a cavity 48 and an angled surface 50 is positioned adjacent to the first annular shoulder 38. An annular chamfer member 52 having a chamfer 54 is positioned between the annular ring 44 and the lock assisting member 46. The annular ring 44 maintains the annular chamfer member 52 and the annular lock assisting member 46 within the coupling sleeve 20. It will be appreciated that instead of using an annular ring, the radial lip 37 can be crimped, swagged, formed or staked to hold the members in place. An annular pusher support ring 56 is positioned adjacent to the second shoulder 40. In the present embodiment, the annular ring 44, annular lock assisting member 46 and annular chamfer member 52 are made of metal. However, it should be understood that these members can be made of a variety of materials, including plastic, depending on the application.

Still referring to FIGS. 1 and 2, two O-ring seals 58 and 60 are positioned in the space between the lock assisting member 46 and the pusher support ring 56. In the present embodiment, an annular spacer ring 62 is positioned between the O-ring seals 58 and 60. The O-ring seals prevent the leakage of fluids when the members are connected. The O-ring seals 58 and 60 can be made of any suitable elastomeric material. Only one O-ring seal and one spacer can be used depending on the application. Use of a single seal reduces the cost of the overall unit.

As shown in FIG. 1, the valve sleeve 22 is defined by an annular wall 64 that has a cross-sectional diameter that is less than the cross-section diameter of the coupling sleeve 20. The annular wall 64 defines a fluid passage 65. The valve sleeve 22 has a restricted open end 66 opposed to a valve sleeve fluid passageway end 68. A valve 70 is positioned in the valve sleeve 22. In the present embodiment, the valve 70 is a metal ball valve having a spherical configuration. However, it should be understood that the valve can be made of a variety of materials and have a variety of geometric configurations depending on the application. The valve sleeve 22 further includes a coiled spring 72. A first end 74 of the spring 72 engages the valve 70 and a second end 76 engages or is engaged by some structure of the valve sleeve. In the present embodiment, the second end 76 of the spring 72 engages an inwardly extending radial lip 78 that is adjacent to the open end 66. The spring 72 can also be engaged by the valve sleeve 22 by swaging, crimping or press fitting in a ring. The valve 70 is biased toward the fluid passageway 24 by the spring 72. The coiled spring 72 can be made of metal or any other suitable resilient material. As shown in FIG. 1A, the coiled spring 72 can include a tab 73 to prevent the coiled spring 72 from becoming entangled with other coiled springs during shipping and handling of the springs prior to insertion of the coiled spring 72 in fluid passage 65. The tab 73 prevents entanglement by restricting the size of the open end of the coiled spring 72 so that other springs will not enter the open end and become entangled or otherwise connected to the coiled spring 72.

Still referring to FIGS. 1 and 2, an annular valve seal 80 having a fluid opening can be positioned in the valve sleeve 22 adjacent to the fluid passageway 24. In this embodiment, the valve seal 80 has a square or rectangular cross-section, and the seal abuts the valve sleeve fluid passageway end 68 of the valve sleeve 22. It should be understood that the valve seal 80 can have a variety of geometric shapes, as described below, and can be spaced from the valve sleeve fluid passageway end 68 depending on the application. The valve seal 80 prevents leakage of fluid when the valve 70 is in the closed position as shown in FIG. 1. A valve seal may not be required if low volume leakage around the valve is allowed when the members are disconnected.

The assembly 10 includes a valve pusher 82 that has a first pusher end 84 and a second pusher end 86. The first end 84 is positioned in the coupling sleeve 20 and the second end 86 is positioned in the fluid passageway 24 when the valve 70 is in the closed position. As shown in FIG. 2, the second end 86 moves into the valve sleeve 22 when the valve 70 is open. The first end 84 has an annular configuration that has a diameter less than the diameter of the coupling sleeve 20. The second end 86 has an annular configuration that has a diameter less than the diameter of the fluid passageway 24. The second end 86 includes a plurality of fingers 88 that engage the valve 70. A fluid opening 90 extends between the first pusher end 84 and the second pusher end 86. The opening 90 allows for the passage of fluid through the valve pusher 82.

As shown in FIG. 2, the second member 92 includes an outer surface 94, an inner surface 96 and a terminal portion 98. The inner surface defines an annular wall 100 having a fluid passage 102.

Still referring to FIG. 2, the first member 12 and second member 92 are connected together by a coupling assembly that is disclosed in assignee's U.S. Pat. No. 5,226,682, which is incorporated herein by reference. In the present embodiment, the outer surface 94 of the second member 92 includes a ridge 104 having a ramp 106, an apex 108 and a shoulder 110. Prior to insertion of the second member 92 into the coupling sleeve 20, an annular lock ring 112 is positioned adjacent to the ramp 106. As the second member 92 is inserted in the coupling sleeve 20, the lock ring 112 is engaged by the angled surface 50 of the lock assisting member 46. This causes the lock ring 112 to travel up the ramp 106, into the cavity 48, over the apex 108 and rest between the shoulder 110 and the chamfer 54 of the chamfer member 52. A lock ring pusher 114 having a handle 116 and a pushing end 118 can be included in the assembly as shown in FIG. 2. When the first member 12 is to be disengaged from the second member 92, the handle 116 is pushed to cause the pushing end 118 to engage the lock ring 112 to cause it to travel back over the apex 108.

As shown in FIG. 2, when the second member 92 is inserted in the coupling sleeve, the terminal portion 98 of the second member 92 first engages the O-ring seals 58 and 60 and then the first pusher end 84 of the valve pusher 82. This causes the second pusher end 86 to engage the valve 70 to unseat the valve 70 from the valve seal 80. The unseating of the valve 70 allows for maximum flow condition between the first member 12 and the second member 92 through the fluid passageways 102, 90 and 65. The rate of flow is determined by a variety of factors including the size and shape of the members and the valve, and fluid pressure.

The first member 12 and second member 92 can be made of metal. The members can also be made of any other suitable material, including plastic, depending on the application.

Figure 3:
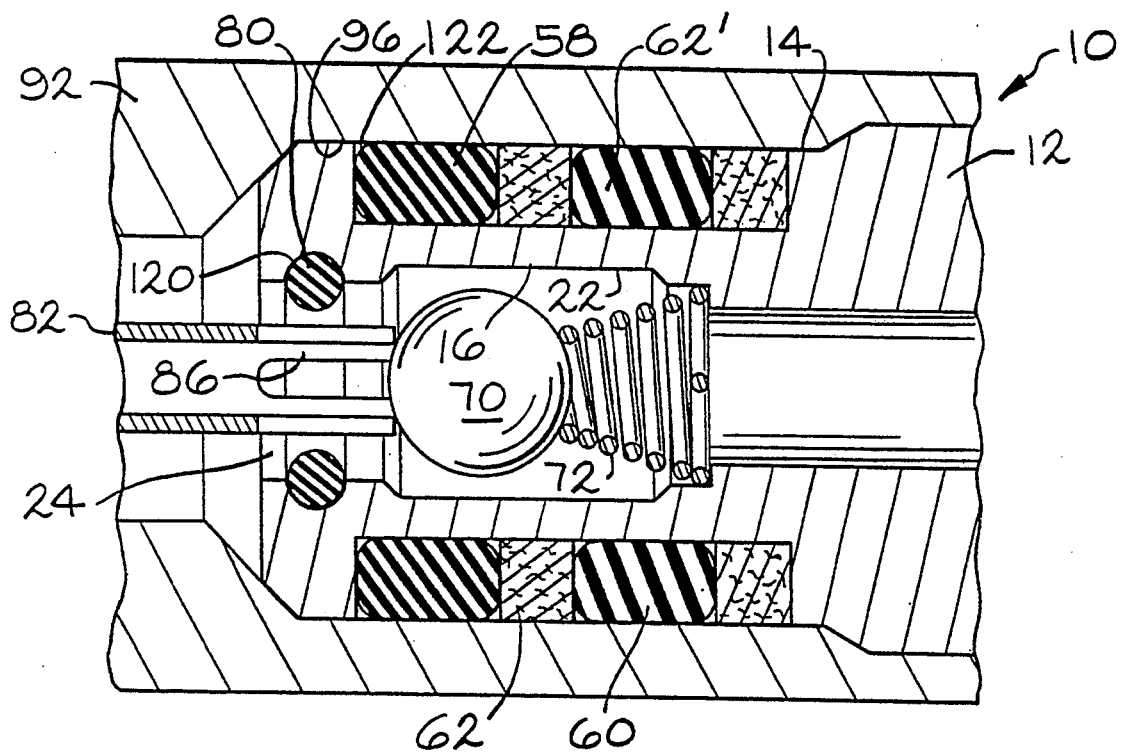
FIG. 3 is a cross-sectional view of a second embodiment of the present invention showing a valve seal having a circular cross-section.

Referring now to FIG. 3, a second embodiment of the present invention is shown. In this embodiment, the assembly 10 includes a first member 12 inserted in a second member 92 that has a larger diameter than the first member. The interior surface 16 of the first member 12 defines a valve 70 and a coiled spring 72. An annular valve seal 80 having a circular cross-section is positioned adjacent to a fluid passageway 24 in a retaining groove 120. The groove 120 prevents the seal from being forced out of position due to high fluid pressure in the assembly 10. The exterior surface 14 of the first member defines a recess 122 that receives seals, such as O-ring seals, for sealing the space between the exterior surface 14 of the first member and the inner surface 96 of the second member 92. In the present embodiment, two O-ring seals 58 and 60 and two spacers 62 and 62' are positioned in the recess 120. As shown in FIG. 3, a valve pusher 82 having a second pusher end 86 unseats the valve 70 when the first member 12 is inserted in the second member 92.

Figure 4:
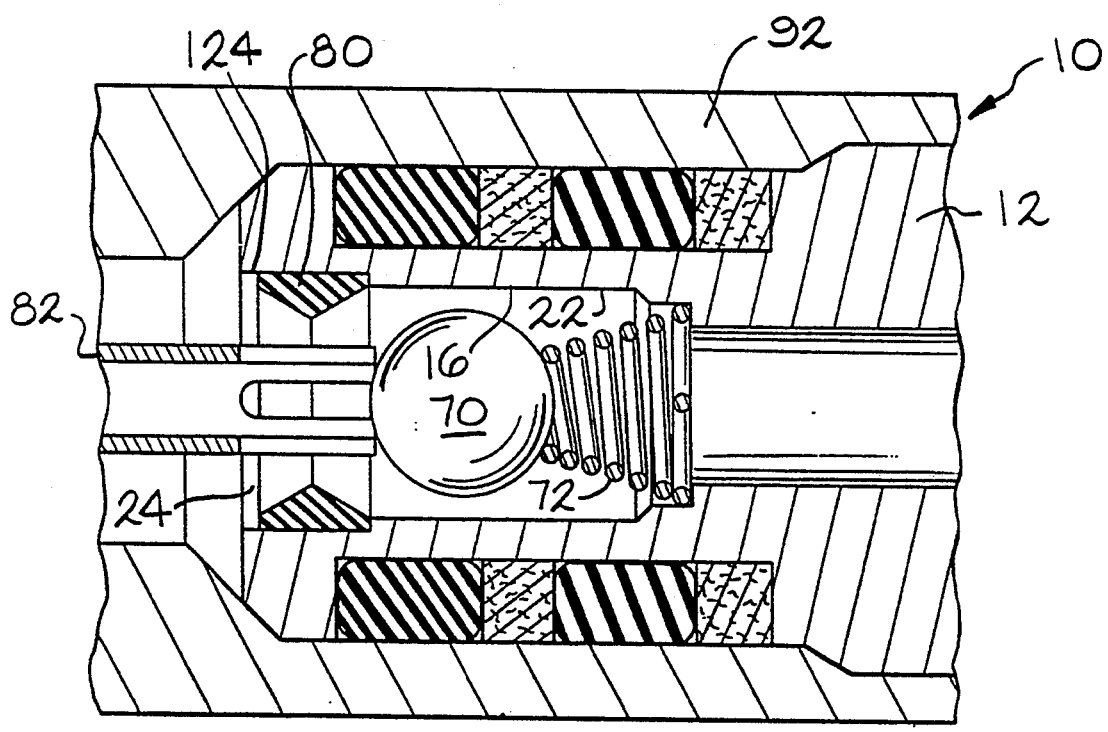
FIG. 4 is a cross-sectional view of a third embodiment of the present invention showing a valve seal having a pyramidal cross-section.

A third embodiment of the invention is shown in FIG. 4. The assembly 10 is similar to the embodiment shown in FIG. 3 and described above. In this embodiment, the valve seal 80 has a pyramidal cross-section. The seal is positioned in a seal channel 124. It has been found that a seal having a pyramidal configuration is especially suitable for high fluid pressure applications.

Figure 5:
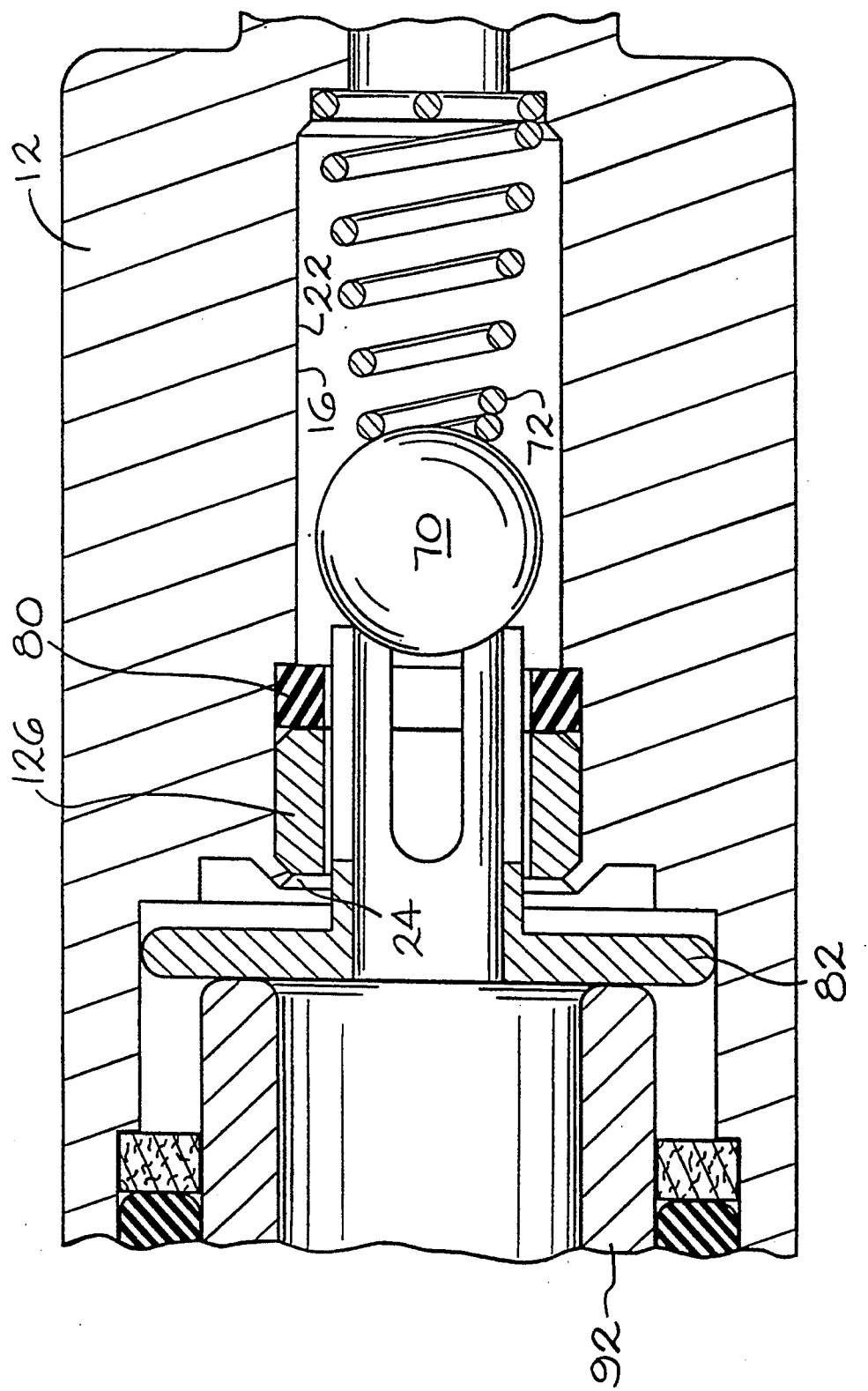
FIG. 5 is a cross-sectional view of a fourth embodiment of the present invention, similar to the first embodiment shown in FIGS. 1 and 2, showing a valve seal adjacent a valve seal support member.

Referring now to FIG. 5, a fourth embodiment of the invention is shown. This embodiment is similar to the first embodiment shown in FIGS. 1 and 2 and described above. In this embodiment, a valve seal 80 having a square configuration is positioned in a seal channel 124. A valve seal support member 126 is positioned between the seal 80 and the fluid passageway 24. It has been found that the member 126 prevents the dislocation of the seal 80 in high fluid pressure applications.

It should be understood that many changes can be made to the invention as described above and still fall within the scope of the following claims.

We claim:

1. A valve assembly for use in the coupling of two members, comprising, in combination:

a first member having an exterior surface and an interior surface, said interior surface defining a coupling sleeve consisting of an annular wall having an open end and an opposed fluid passageway end and a valve sleeve, a fluid passageway positioned between said coupling sleeve and said valve sleeve, said annular wall defining a first annular shoulder, a second annular shoulder spaced from said first annular shoulder and a first annular groove positioned between said open end and said first shoulder, an annular ring positioned in said first annular groove, an annular lock assisting member positioned adjacent to said first annular shoulder, an annular chamfer member having a chamfer positioned between said annular ring and said lock assisting member and an annular pusher support ring positioned adjacent to said second shoulder;

a valve positioned in said valve sleeve, said valve being biased toward said fluid passageway by resilient means;

a valve pusher having a first end and a second end, said first end positioned in said coupling sleeve, said second end positioned in said fluid passageway;

a second member having an outer surface, an inner surface and a terminal portion, whereby when said second member is inserted in said coupling sleeve, said terminal portion engages said first end of said pusher causing said second end of said pusher to engage said valve to unseat said valve, thereby allowing fluid flow between said first member and said second member.

2. The valve assembly of claim 1, wherein said exterior surface of said first member defines a portion for receiving tubing.

3. The valve assembly of claim 1, wherein at least one O-ring seal is positioned between said lock assisting member and said support ring.

4. The valve assembly of claim 1, wherein an annular lock ring is positioned adjacent to said chamfer member.

5. The valve assembly of claim 4, wherein said outer surface of said second member includes a ridge consisting of a ramp, an apex and a shoulder, whereby when said second member is inserted in said first member, said lock ring travels up said ramp, over said apex and against said shoulder to engage said ridge and said chamfer on said chamfer member to connect said first member to said second member.

6. The valve assembly of claim 5, wherein said second member includes a release handle to cause said lock ring to travel over said apex to release said first member from said second member.

7. The valve assembly of claim 1, wherein said valve is a ball valve.

8. The valve assembly of claim 1, wherein an annular valve seal is positioned in said valve sleeve.

9. The valve assembly of claim 8, wherein said valve seal has a square cross-sectional configuration.

10. The valve assembly of claim 8, wherein said valve seal has a circular cross-sectional configuration.

11. The valve assembly of claim 8, wherein said valve seal has a pyramidal cross-sectional configuration.

12. The valve assembly of claim 1, wherein said resilient means is a coiled spring.

13. The valve assembly of claim 12, wherein said coiled spring includes at least one tab.

14. The valve assembly of claim 1, wherein said valve pusher includes an opening for the passage of fluid.

* * * * *